United States Patent
Ballal et al.

(10) Patent No.: US 11,352,965 B2
(45) Date of Patent: Jun. 7, 2022

(54) REVERSE FLOW DETECTION SYSTEM

(71) Applicant: Caterpillar Inc., Peoria, IL (US)

(72) Inventors: Prasanna M. Ballal, Dunlap, IL (US);
Shawn M. Damm, Peoria, IL (US);
Joseph P. Fuller, Morton, IL (US);
Oskar Turner, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 131 days.

(21) Appl. No.: 16/657,555

(22) Filed: Oct. 18, 2019

(65) Prior Publication Data

US 2021/0115859 A1   Apr. 22, 2021

(51) Int. Cl.
| | |
|---|---|
| F02D 33/00 | (2006.01) |
| F02D 19/02 | (2006.01) |
| F02D 41/00 | (2006.01) |
| F02M 21/02 | (2006.01) |
| F02M 37/00 | (2006.01) |
| F02D 19/06 | (2006.01) |

(52) U.S. Cl.
CPC ......... *F02D 33/006* (2013.01); *F02D 19/027* (2013.01); *F02D 19/06* (2013.01); *F02D 19/0613* (2013.01); *F02D 19/0621* (2013.01); *F02D 19/0623* (2013.01); *F02D 19/0628* (2013.01); *F02D 19/0642* (2013.01); *F02D 19/0647* (2013.01); *F02D 41/0027* (2013.01); *F02M 21/0218* (2013.01); *F02M 37/0064* (2013.01)

(58) Field of Classification Search
CPC ............... F02D 33/006; F02D 19/0647; F02D 19/0621; F02D 19/0628; F02D 19/06; F02D 19/0623; F02D 19/0642; F02D 19/0613; F02D 19/027; F02D 41/0027; F02M 37/0064; F02M 21/0218
USPC .................................. 123/525, 526, 527, 529
See application file for complete search history.

(56) References Cited

U.S. PATENT DOCUMENTS

| | | | | |
|---|---|---|---|---|
| 3,718,000 | A * | 2/1973 | Walker | F02D 19/0631 60/285 |
| 5,373,828 | A * | 12/1994 | Askew | F02M 59/366 123/458 |
| 5,392,740 | A * | 2/1995 | Teramoto | F02B 43/00 123/3 |
| 5,730,108 | A * | 3/1998 | Hill | F02D 41/003 123/531 |

(Continued)

FOREIGN PATENT DOCUMENTS

| | | |
|---|---|---|
| CN | 1111645 C | 6/2003 |
| JP | 4112315 B2 | 4/2008 |

(Continued)

*Primary Examiner* — Sizo B Vilakazi
*Assistant Examiner* — Brian R Kirby
(74) *Attorney, Agent, or Firm* — Bookoff McAndrews PLLC

(57) ABSTRACT

A method for detecting reverse flow for a dual fuel engine is disclosed. The engine may include an intake manifold, a liquid fuel supply line and a gaseous fuel supply line, the gaseous fuel supply line including a gaseous fuel supply and a gaseous fuel rail. The method may include: operating the dual fuel engine in a liquid fuel only mode via the liquid fuel supply line; determining a reverse flow in the gaseous fuel supply line; and outputting an indication of reverse flow in response to the determination of reverse flow.

20 Claims, 3 Drawing Sheets

(56) References Cited

U.S. PATENT DOCUMENTS

| | | | | |
|---|---|---|---|---|
| 6,009,860 | A * | 1/2000 | Brown | F02D 19/024 |
| | | | | 123/529 |
| 6,044,806 | A * | 4/2000 | Brown | F02M 21/0254 |
| | | | | 123/27 GE |
| 7,313,497 | B2 * | 12/2007 | Breen | F16K 37/0091 |
| | | | | 702/114 |
| 7,322,345 | B2 * | 1/2008 | Saito | F02D 19/027 |
| | | | | 123/529 |
| 7,444,993 | B2 | 11/2008 | Hofmeister | |
| 7,484,406 | B2 * | 2/2009 | Miyahara | F02M 25/0809 |
| | | | | 73/114.39 |
| 7,810,475 | B2 * | 10/2010 | Peters | F02M 25/0836 |
| | | | | 123/519 |
| 8,602,011 | B2 * | 12/2013 | Watanabe | F02D 19/0623 |
| | | | | 123/575 |
| 8,783,281 | B2 * | 7/2014 | Carter | F02D 19/027 |
| | | | | 137/206 |
| 8,919,325 | B2 * | 12/2014 | Pursifull | F02D 41/0025 |
| | | | | 123/458 |
| 8,967,123 | B2 | 3/2015 | Saito et al. | |
| 9,404,429 | B2 * | 8/2016 | Foege | F02D 19/10 |
| 9,587,579 | B2 | 3/2017 | Ulrey et al. | |
| 9,816,449 | B2 * | 11/2017 | Miyamoto | F02D 41/3094 |
| 9,976,523 | B2 | 5/2018 | Sarikaya et al. | |
| 10,934,948 | B2 * | 3/2021 | Engfehr | F02D 19/0623 |
| 2004/0168508 | A1 * | 9/2004 | Henderson | F02M 26/47 |
| | | | | 73/114.76 |
| 2010/0223984 | A1 | 9/2010 | Pursifull | F02M 25/0836 |
| | | | | 73/114.39 |
| 2010/0293919 | A1 * | 11/2010 | Poisson | F02C 7/236 |
| | | | | 60/39.281 |
| 2011/0017174 | A1 * | 1/2011 | Ulrey | F02D 19/0692 |
| | | | | 123/456 |
| 2012/0072095 | A1 * | 3/2012 | Shinoda | F02D 19/061 |
| | | | | 701/103 |
| 2012/0186560 | A1 * | 7/2012 | Lund | F02D 41/0027 |
| | | | | 123/495 |
| 2012/0291758 | A1 * | 11/2012 | Saito | F02D 19/0615 |
| | | | | 123/515 |
| 2013/0000607 | A1 * | 1/2013 | Watanabe | F02D 41/0027 |
| | | | | 123/479 |
| 2013/0054124 | A1 * | 2/2013 | Stoll | F02D 19/027 |
| | | | | 701/112 |
| 2013/0098040 | A1 * | 4/2013 | Zhang | F02C 3/305 |
| | | | | 60/734 |
| 2013/0255636 | A1 * | 10/2013 | Pursifull | F02D 19/0613 |
| | | | | 123/446 |
| 2014/0182552 | A1 * | 7/2014 | Brown | F02D 19/22 |
| | | | | 123/456 |
| 2014/0311451 | A1 * | 10/2014 | Fang | F02M 21/0281 |
| | | | | 123/445 |
| 2015/0204283 | A1 * | 7/2015 | VanDerWege | F02M 35/10229 |
| | | | | 123/445 |
| 2015/0219023 | A1 * | 8/2015 | Kolhouse | F02D 41/0025 |
| | | | | 60/323 |
| 2015/0377159 | A1 * | 12/2015 | Fisher | F02D 41/22 |
| | | | | 123/525 |
| 2016/0102618 | A1 * | 4/2016 | Payne | F02D 19/0676 |
| | | | | 123/575 |
| 2018/0238273 | A1 * | 8/2018 | Maegawa | F02D 41/22 |
| 2018/0320605 | A1 * | 11/2018 | Mumford | F02D 19/0678 |

FOREIGN PATENT DOCUMENTS

| | | | | |
|---|---|---|---|---|
| JP | 2015124713 A * | 7/2015 | | F02D 19/0692 |
| JP | 6441291 B2 | 11/2018 | | |
| WO | WO2012/167799 A1 * | 11/2013 | | |

* cited by examiner

REVERSE FLOW DETECTION SYSTEM

TECHNICAL FIELD

The present disclosure relates generally to dual fuel engines, and more particularly, to a reverse flow detection system for dual fuel engines.

BACKGROUND

Some internal combustion engines, known as dual fuel engines, are configured to run on two different fuels. For example, such engines may operate on diesel fuel supplied through a diesel fuel supply system and natural gas supplied through a gas supply system. When switching from a natural gas mode to a diesel fuel only mode, it is important to prevent reverse flow of air from an air intake system into the gas supply system during the diesel fuel only mode. Reverse flow in the gas supply system could result in a flammable mixture being created and could pose a safety risk when the engine is operated again in the natural gas mode.

U.S. Pat. No. 8,967,123, issued to Saito on Mar. 3, 2015 ("the '123 patent"), describes a shut off valve fault diagnosis device that performs fault diagnosis of a first shut off valve disposed immediately after a gaseous fuel tank and a second shut off valve that is disposed immediately before a regulator in a gaseous fuel supply system. The device of the '123 patent closes both the first and second shut off valves and performs a fault diagnosis based on a variation tendency in fuel pressure between the first and second shut off valves. A fault is indicated in the first shut off valve if the pressure increases (e.g., a leak exists through the first shut off valve, so fuel flows from the supply through the first shut off valve). A fault is indicated in the second shut off valve if the pressure decreases (e.g., a leak exists through the second shut off valve, so fuel between the first and second shut off valves flows through the second shut off valve. However, the device of the '123 patent is not disclosed as determining if reverse flow occurs through the gas supply line.

The reverse flow detection system of the present disclosure may solve one or more of the problems set forth above and/or other problems in the art. The scope of the current disclosure, however, is defined by the attached claims, and not by the ability to solve any specific problem.

SUMMARY

In one aspect, a method for detecting reverse flow for a dual fuel engine is disclosed. The engine may include an intake manifold, a liquid fuel supply line and a gaseous fuel supply line, the gaseous fuel supply line including a gaseous fuel supply and a gaseous fuel rail. The method may include: operating the dual fuel engine in a liquid fuel only mode via the liquid fuel supply line; determining a reverse flow in the gaseous fuel supply line; and outputting an indication of reverse flow in response to the determination of reverse flow.

In another aspect, a method for detecting reverse flow for a dual fuel engine is disclosed. The engine may include an intake manifold, a liquid fuel supply line and a gaseous fuel supply line, the gaseous fuel supply line including a gaseous fuel supply and a gaseous fuel rail. The method may include: operating the dual fuel engine in a liquid fuel only mode via the liquid fuel supply line; determining a reverse flow in the gaseous fuel supply line based on a sensed gaseous fuel supply pressure of the gaseous fuel supply line, engine intake manifold pressure, and gaseous fuel rail pressure of the gaseous fuel supply line; and outputting an indication of reverse flow in response to the determination of reverse flow.

In yet another aspect, a reverse flow detection system for a dual fuel engine is disclosed. The system may include: an intake manifold for supplying intake air to the engine; a liquid fuel supply line for supplying liquid fuel to the engine; a gaseous fuel supply line including a gaseous fuel supply and a gaseous fuel rail for supplying gaseous fuel to the engine; and a controller configured to: operate the dual fuel engine in a liquid fuel only mode via the liquid fuel supply line; determine a reverse flow in the gaseous fuel supply line; and output an indication of reverse flow in response to the determination of reverse flow.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of surfaces or materials that may be worked in material moving procedures (e.g., gravel, clay, sand, dirt, etc.) and/or can be cut, spread, sculpted, smoothed, leveled, graded, or otherwise treated. In this disclosure, unless stated otherwise, relative terms, such as, for example, "about," "substantially," and "approximately" are used to indicate a possible variation of ±10% in the stated value.

Figure 1:
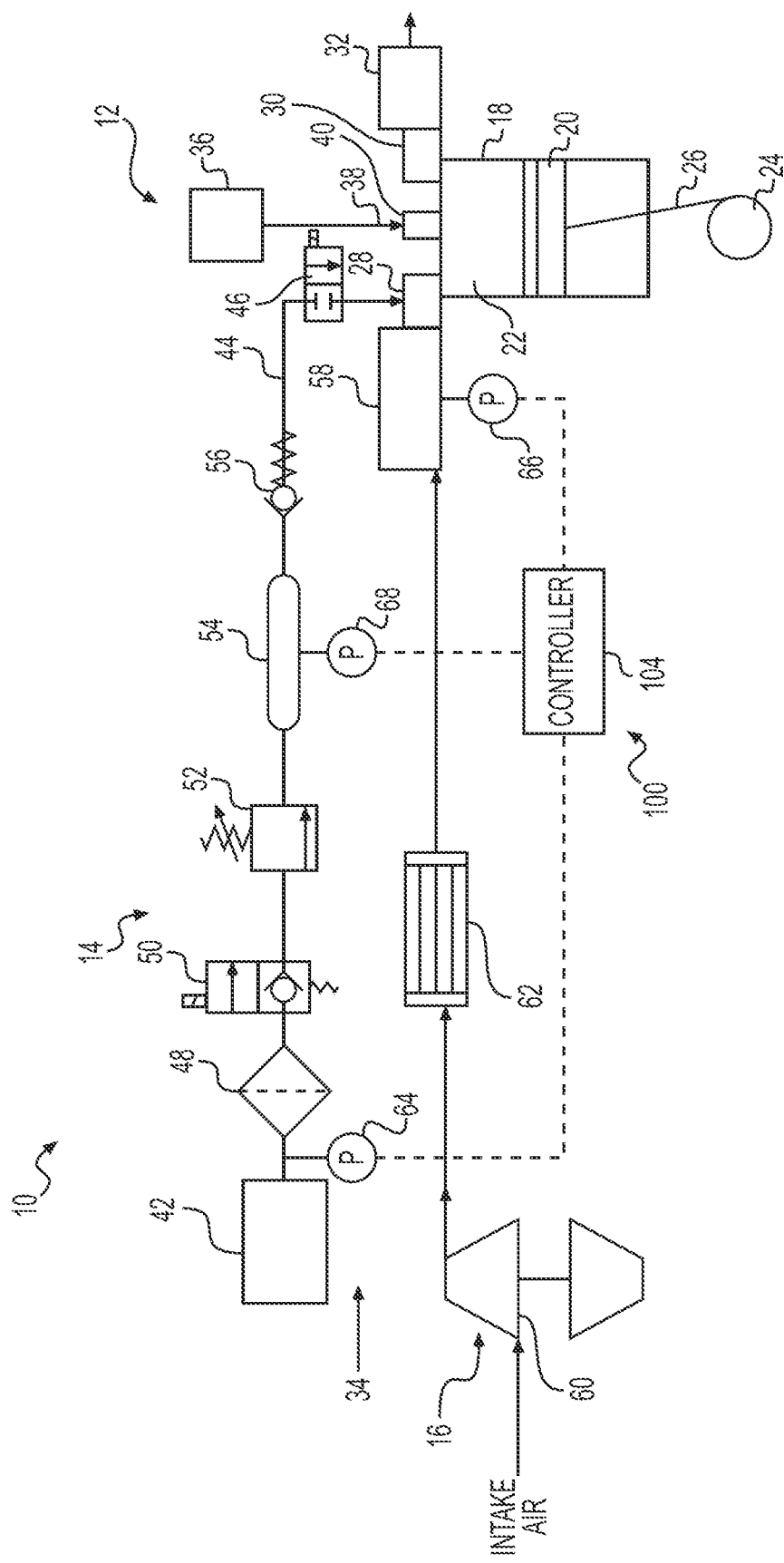
FIG. 1 is a schematic view of a dual fuel engine system having a reverse flow detection system, according to aspects of the disclosure.

FIG. 1 illustrates a schematic view of a dual fuel engine system 10 system having a reverse flow detection system 100. Dual fuel engine system 10 may be an internal combustion engine capable of operating on two fuels. For example, dual fuel engine system 10 may employ liquid fuel and/or gaseous fuel, or a combination of both liquid fuel and gaseous fuel. While diesel fuel is used in the exemplary embodiment, it is understood that any type of liquid fuel may be used, such as gasoline, methanol, ethanol, or any other type of liquid fuel. Further, as used herein, "gaseous fuel" may include fuel that is supplied to engine system 10 in gaseous form. Gaseous fuel may include, for example, natural gas, propane, bio-gas, landfill gas, carbon monoxide, hydrogen, or mixtures thereof. It is understood that engine system 10 may employ only a single fuel at one time (liquid or gaseous fuel), or may employ both the liquid fuel and the gaseous fuel in unison.

As shown in FIG. 1, dual fuel engine system 10 includes a diesel fuel delivery system 12 and a gaseous fuel delivery system 14. Dual fuel engine system 10 may also include an air intake system 16 and a plurality of engine cylinders 18 (a single engine cylinder 18 is depicted in FIG. 1). Diesel fuel delivery system 12 may deliver diesel fuel to cylinders 18, gaseous fuel system 14 may deliver gaseous fuel to cylinders 18, and intake system 16 may deliver intake air to cylinders 18, as detailed further below. Each engine cylinder 18 may include a piston 20 slidably and reciprocally disposed to form a combustion chamber 22 of the cylinder 18. The piston 20 of each cylinder 18 may be connected to a crankshaft 24 via a connecting rod 26 and may provide power to a flywheel (not shown) of the engine system 10, as detailed below. The cylinders 18 may also include an intake port 28 for providing an air (e.g., intake air) and fuel (e.g., gaseous fuel) mixture to the combustion chamber 22. Cylinder 18 may also include an exhaust port 30 for exhausting combustion gases from cylinder 18 to an exhaust system 32.

Diesel fuel delivery system 12 may include a diesel fuel supply 36, such as a diesel fuel tank, fuel pump, fuel rail, and a diesel fuel supply line 38 for supplying diesel fuel from supply 36 to cylinder 18. For example, diesel fuel may be supplied to each cylinder 18 via a diesel fuel injector 40. It is understood that diesel fuel delivery system 12 may include any number and/or combination of valves or other components known in the art.

Gaseous fuel delivery system 14 may include a gaseous fuel supply 42, such as a gas tank, and a gaseous fuel supply line 44 for supplying gaseous fuel from supply 42 to cylinder 18. For example, gaseous fuel may be supplied to each cylinder 18 via a gaseous fuel injector 46, such as a solenoid operated gas admission valve (SOGAV), through intake system 16, as detailed further below. Accordingly, gaseous fuel may flow from supply 42 through supply line 44 and into intake system 16. Gaseous fuel delivery system 14 may also include a filter 48, a gas shut off valve (GSOV) 50, a regulator 52, a gaseous fuel rail 54, and a check valve 56.

Filter 48 may remove suspended liquids, dirt, and/or other particulates from the gaseous fuel to prevent the suspended liquids, dirt, and/or other particulates from clogging or damaging components of the gaseous fuel delivery system 14. Gas shut off valve 50 may be disposed in gaseous fuel supply line 44 downstream of supply 42. Valve 50 may include a closed state (shown in FIG. 1) and an open state. In the closed state, valve 50 may prevent flow of gaseous fuel from supply 42 into supply line 44. Valve 50 may include a check valve, or the like, for preventing flow from supply 42 towards cylinder 18 when valve 50 is in the closed state, while allowing high pressure flow in the opposite, reverse direction (e.g., if the pressure in gaseous fuel supply line 44 is greater than the pressure of supply 42). In the open state, valve 50 may enable flow of gaseous fuel from supply 42 into supply line 44. Regulator 52 may include a valve for reducing and regulating a pressure of the gaseous fuel exiting supply 42 and lowering the pressure to a predetermined level. Gaseous fuel rail 54 may distribute the gaseous fuel at a predetermined pressure to the gaseous fuel injectors 46 (only one injector is shown in FIG. 1). It is understood that valve 50, regulator 52, and injector 46 may include any type of valves known in the art.

Check valve 56 may allow flow in one direction (e.g., from supply 42 towards intake system 16) and automatically prevent reverse flow, or back flow. As used herein, "reverse flow" is any type of flow in the opposite direction (e.g., from intake system 16 towards supply 42) back upstream in gaseous fuel supply line 44. Check valve 56 may include any type of check valve, such as ball check valve, disc check valve, diaphragm check valve, or any other type of valve for preventing flow in at least one direction.

Intake system 16 may include an air intake manifold 58. Intake manifold 58 may supply intake air to the cylinder 18. In some embodiments, gaseous fuel supply line 44 may be connected to the intake manifold 58 (e.g., via injector 46) for providing gaseous fuel to the intake manifold 58. Accordingly, intake manifold 58 may supply a gaseous fuel and air mixture to cylinder 18 (e.g., via intake port 28). Intake system 16 may also include a turbocharger 60 and an air cooler 62. Turbocharger 60 may include a turbine and compressor for compressing intake air, and cooler 62 may cool the compressed air. The turbine may also receive exhaust gases from exhaust port 30 of cylinders 18. Accordingly, cooled compressed air, or boost air, at a high pressure may be provided to inlet manifold 58, and thus to cylinder 18 to facilitate greater energy production. It is understood that intake system 16 may include any number and/or combination of valves or other components, as is known in the art.

Reverse flow detection system 100 includes a controller 104, such as an engine control module (ECM), and a sensor system 34 connected to controller 104. Sensor system 34 may include one or more pressure sensors. The pressure sensors may be existing sensors already installed in engine system 10. For example, sensor system 34 may include a first pressure sensor 64, a second pressure sensor 66, and a third pressure sensor 68. First pressure sensor 64 may be located in gaseous fuel supply line 44 immediately downstream of gaseous fuel supply 42 and may sense a gaseous fuel supply pressure. Second pressure sensor 66 may be located in intake manifold 58 and may sense intake manifold pressure. Third pressure sensor 68 may be located in gaseous fuel rail 54 and may sense a gaseous fuel rail pressure. It is understood that sensors 64, 66, 68 may include any type of sensors for sensing pressure, such as resistive sensors, capacitive sensors, piezoelectric sensors, optical sensors, micro electro-mechanical system sensors, or the like. Further, sensor system 34 may include any number and/or combination of sensors as necessary.

Figure 2:
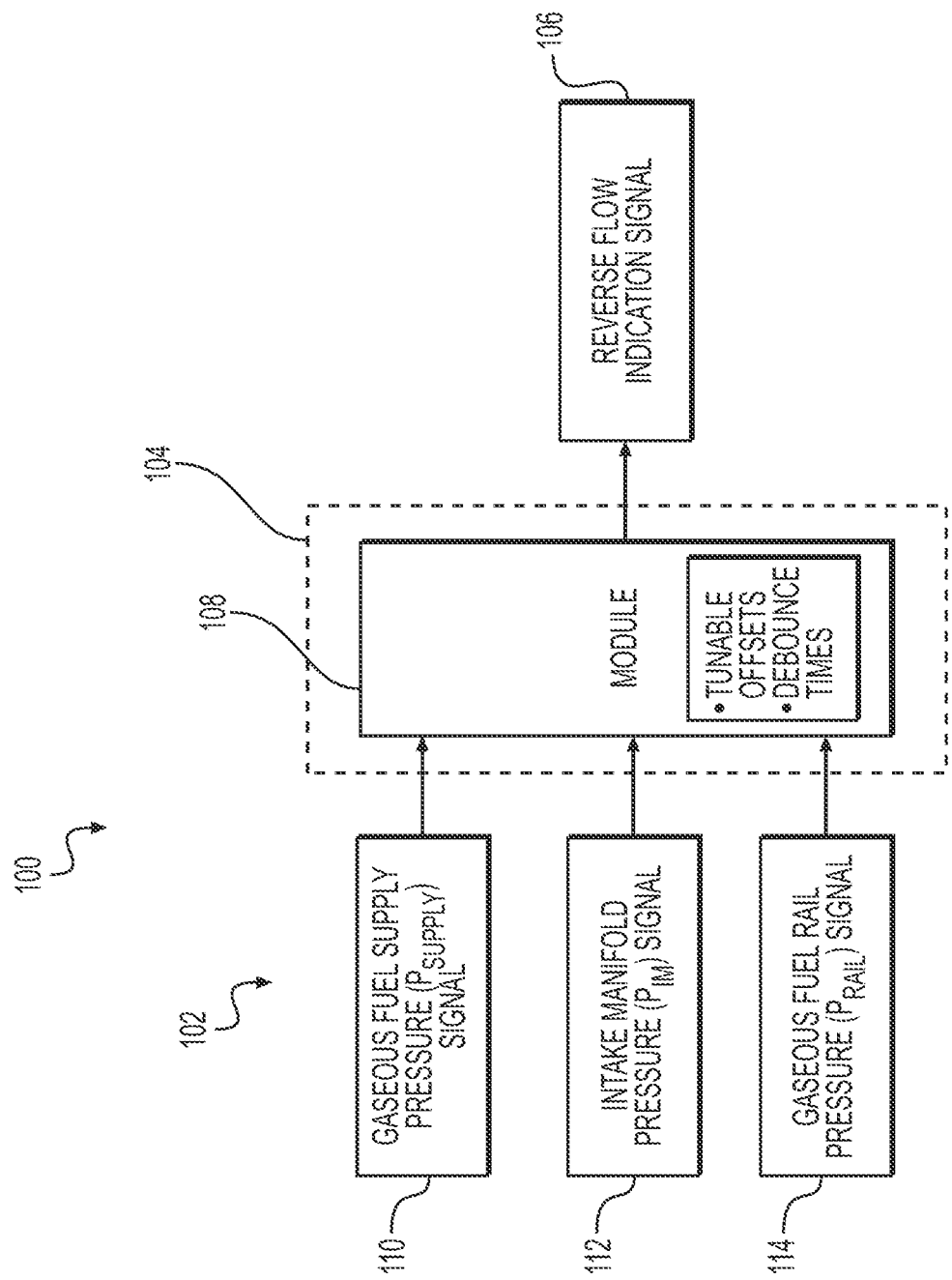
FIG. 2 is a schematic view of the exemplary reverse flow detection system for the dual fuel engine system of FIG. 1.

FIG. 2 illustrates a schematic view of the exemplary reverse flow detection system 100 for operation and/or control of at least portions of the dual fuel engine system 10. System 100 may include inputs 102, controller 104, and output 106. Inputs 102 may include, for example, gaseous fuel supply pressure ($P_{SUPPLY}$) signal 110 from first pressure sensor 64, intake manifold pressure ($P_{IM}$) signal 112 from second pressure sensor 66, and gaseous fuel rail pressure ($P_{RAIL}$) signal 114 from third pressure sensor 68. Output 106 may include, for example, a reverse flow indication signal. Controller 104 also includes a reverse flow detection module 108. Reverse flow detection module 108 may receive inputs 102, implement a method 300 for detecting reverse flow and control output 106, as described with reference to FIG. 3 below.

Controller 104 may embody a single microprocessor or multiple microprocessors that may include means for detecting reverse flow of the dual fuel engine system. For example, controller 104 may include a memory, a secondary storage device, a processor, such as a central processing unit or any other means for accomplishing a task consistent with the present disclosure. The memory or secondary storage device associated with controller 104 may store data and/or software routines that may assist controller 104 in performing its functions, such as the functions of method 300 of FIG. 3. Further, the memory or secondary storage device associated with controller 104 may also store data received from the various inputs 102 associated with reverse flow detection system 100. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry.

Controller 104 may also include stored values for use by module 108. For example, the stored values may include tunable offsets and debounce times. The tunable offsets may be small values (e.g., pressure values) for being added to the gaseous fuel supply pressure ($P_{SUPPLY}$) values to avoid false trips in the reverse flow detection method 300, as detailed below. Debounce times may include predetermined time values for which a condition must be met for the predetermined amount of time to avoid false trips in the reverse flow detection method 300, as detailed below.

The reverse flow indication signal output 106 may include control of aspects of engine system 10. For example, reverse flow indication signal output 106 may include controller 104 outputting an alert, such as a light, an audible alert, an alert on a display, or the like when a reverse flow condition is triggered. Reverse flow indication signal output 106 may also include controller 104 adjusting the engine system 10. For example, controller 104 may derate or shut down engine system 10 and/or may prevent or stop the engine system 10 from operating in a gaseous fuel mode.

INDUSTRIAL APPLICABILITY

The disclosed aspects of the reverse flow detection system 100 of the present disclosure may be used in any dual fuel engine system 10.

Referring to FIG. 1, during the operation of engine system 10, the engine system may be shifted to operate in a diesel fuel only mode. During such a shift, controller 104 may send a signal to close gas shut off valve 50 and injector 46 to prevent gaseous fuel from flowing through supply line 44 from gas supply 42. In the diesel fuel only mode, only diesel fuel is supplied to cylinders 18. For example, controller 104 may control aspects of diesel fuel delivery system 12, such as opening a diesel fuel control valve to allow diesel fuel to flow through supply line 38 to cylinders 18 (e.g., through injectors 40). Further, intake air from intake system 16 may be supplied to cylinders 18 through intake manifold 58. Accordingly, an air and diesel fuel mixture may be drawn or forced into combustion chamber 22 during an intake stroke of piston 20. Piston 20 may cycle through compression and power (combustion) strokes and byproducts of combustion (e.g., exhaust gases) may be pushed through exhaust port 30 during an exhaust stroke. As such, pistons 20 may power crankshaft 24 to provide useful mechanical working motion to the flywheel. Thus, controller 104 may operate engine system 10 in the diesel fuel only mode via the supply line 38. During such a diesel fuel only mode, injector 46, regulator 52, and gas shutoff valve 50 may not be adequate or designed to prevent reverse flow through supply line 44. Thus, check valve 56 prevents flow of diesel fuel or intake air from reverse flowing through supply line 44.

Figure 3:
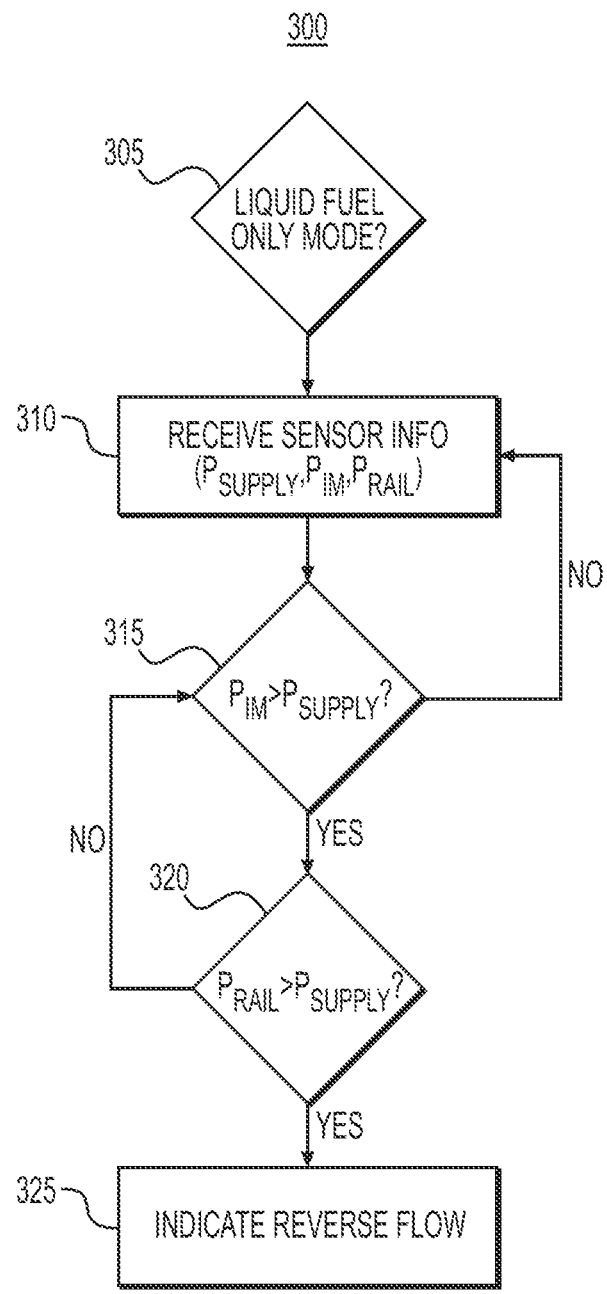
FIG. 3 provides a flowchart depicting an exemplary method for detecting reverse flow for the system of FIG. 1.

FIG. 3 illustrates a flowchart depicting an exemplary method 300 for detecting reverse flow for the dual fuel engine system 10. In step 305, module 108 may determine that engine system 10 is operating in diesel only fuel mode.

In step 310, module 108 may receive sensor information. For example, module 108 may receive the gaseous fuel supply pressure ($P_{SUPPLY}$) signal 110, the intake manifold pressure ($P_{IM}$) signal 112, and the gaseous fuel rail pressure ($P_{RAIL}$) signal 114.

In step 315, module 108 may perform a first check and compare intake manifold pressure ($P_{IM}$) and gaseous fuel supply pressure ($P_{SUPPLY}$). Module 108 may continuously receive the sensor information if intake manifold pressure ($P_{IM}$) is not greater than or is equal to gaseous fuel supply pressure ($P_{SUPPLY}$) (step 315: NO). If intake manifold pressure ($P_{IM}$) is greater than gaseous fuel supply pressure ($P_{SUPPLY}$) (step 315: YES), module 108 may perform a second check and compare gaseous fuel rail pressure ($P_{RAIL}$) and gaseous fuel supply pressure ($P_{SUPPLY}$) (step 320). Module 108 may continuously receive the sensor information and perform the first check if gaseous fuel rail pressure ($P_{RAIL}$) is not greater than gaseous fuel supply pressure ($P_{SUPPLY}$) (step 320: NO). If gaseous fuel rail pressure ($P_{RAIL}$) is greater than or equal to gaseous fuel supply pressure ($P_{SUPPLY}$) (step 320: YES), module 108 may determine a reverse flow in the gaseous fuel supply line 44. In step 325, module 108 may output an indication of reverse flow in response to the determination of reverse flow. For example, module 108 (via controller 104) may send a warning signal to a display or other user interface, derate the engine system 10, and/or send a signal to shut down engine system 10.

When in the diesel only fuel mode, if check valve 56 fails, intake air may reverse flow into supply line 44. As intake air leaks through check valve 56 into gaseous fuel supply line 44, gaseous fuel supply pressure ($P_{SUPPLY}$) may decrease below intake manifold pressure ($P_{IM}$). Likewise, gaseous fuel rail pressure ($P_{RAIL}$) may increase above gaseous fuel supply pressure ($P_{SUPPLY}$). If intake air reverse flows into gaseous fuel supply line 44, the intake air may mix with the gaseous fuel in the gaseous fuel supply line 44. Accordingly, a flammable mixture may be created because of too much air in the gaseous fuel and air mixture when the engine is operated again in the gaseous fuel mode. Module 108 may perform the first check (step 315) for redundancy to avoid false trips of detecting reverse flow. For example, reverse flow of intake air into gaseous fuel supply line 44 will not exist if gaseous fuel supply pressure ($P_{SUPPLY}$) is greater than intake manifold pressure ($P_{IM}$). However, if check valve 56 is functioning correctly (e.g., not leaking), reverse flow will not exist even if intake manifold pressure ($P_{IM}$) is greater than gaseous fuel supply pressure ($P_{SUPPLY}$) (e.g., check valve 56 will prevent reverse flow into supply line 44). Accordingly, when intake air is reverse flowing into supply line 44 (e.g., check valve 56 is leaking), gaseous fuel rail pressure ($P_{RAIL}$) will increase to, or above, intake manifold pressure ($P_{IM}$). Thus, module 108 may perform the second check (step 320) to determine if check valve 56 has failed (e.g., check valve 56 is leaking) and intake air is reverse flowing into supply line 44. While the first check and the second check are both performed by module 108 in the exemplary embodiment, it is understood module 108 may perform only the second check (step 320) to determine reverse flow in gaseous fuel supply line 44.

To further avoid false trips in determining reverse flow, module 108 may include a predetermined tunable offset of the gaseous fuel supply pressure ($P_{SUPPLY}$) when comparing to the intake manifold ($P_{IM}$) pressure (e.g., first check) and gaseous fuel rail ($P_{RAIL}$) pressure (e.g., second check). Module 108 may also include a predetermined debounce time. For example, module 108 may compare the intake manifold pressure ($P_{IM}$) to the gaseous fuel supply pressure ($P_{SUPPLY}$) plus the predetermined tunable offset. If the intake manifold pressure ($P_{IM}$) is greater than the gaseous fuel supply pressure ($P_{SUPPLY}$) plus the predetermined tunable offset for the predetermined amount of time (e.g., debounce time), module 108 may perform the second check. Likewise, if gaseous fuel rail pressure ($P_{RAIL}$) is greater than or equal to gaseous fuel supply pressure ($P_{SUPPLY}$) plus the tunable offset for the predetermined amount of time (e.g., debounce time), module 108 may determine the reverse flow in the gaseous fuel supply line 44.

Reverse flow detection system 100 may enable detection of reverse flow in the gaseous fuel delivery system 14. For example, reverse flow detection system 100 may detect and/or indicate that check valve 56, or other valves in the gaseous fuel supply line 44, is failing or has failed and intake air (e.g., boost air) is leaking into the gaseous fuel delivery system 14. Accordingly, reverse flow detection system 100 may help to mitigate and/or prevent safety risks associated with flammable mixtures when/if reverse flow occurs in the gaseous fuel delivery system 14. Further, reverse flow detection system 100 may utilize existing sensors of engine system 10, thus additional components may not be needed or added.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for detecting reverse flow for a dual fuel engine, the engine including an intake manifold, a gaseous fuel injector, a liquid fuel supply line and a gaseous fuel supply line, the gaseous fuel supply line including a gaseous fuel supply and a gaseous fuel rail, the method comprising:
    operating the dual fuel engine in a liquid fuel only mode via the liquid fuel supply line;
    determining a reverse flow of air in the gaseous fuel supply line upstream of a check valve connected between the gaseous fuel supply and the gaseous fuel injector, the reverse flow of air being due to a leak through the check valve; and
    outputting an indication of reverse flow of air in response to the determination of reverse flow of air.

2. The method of claim 1, wherein the determination of reverse flow of air is based on a sensed gaseous fuel supply pressure of the gaseous fuel supply line.

3. The method of claim 2, wherein the determination of reverse flow of air is based on a sensed engine intake manifold pressure.

4. The method of claim 3, wherein the determination of reverse flow of air is based on a sensed gaseous fuel rail pressure of the gaseous fuel supply line.

5. The method of claim 4, wherein the determination of reverse flow of air includes a comparison of the sensed engine intake manifold pressure and the sensed gaseous fuel supply pressure.

6. The method of claim 5, wherein the determination of reverse flow of air includes a comparison of the sensed gaseous fuel rail pressure and the sensed gaseous fuel supply pressure.

7. The method of claim 6, wherein the outputting the indication includes shutting down the engine.

8. The method of claim 6, wherein determining a reverse flow of air includes sensing a leak from the intake manifold through the check valve to the gaseous fuel rail.

9. A method for detecting reverse flow for a dual fuel engine, the engine including an intake manifold, a liquid fuel supply line and a gaseous fuel supply line, the gaseous fuel supply line including a gaseous fuel supply and a gaseous fuel rail, the method comprising:
    operating the dual fuel engine in a liquid fuel only mode via the liquid fuel supply line;
    detecting, with a controller, a reverse flow of air in the gaseous fuel supply line from the intake manifold towards the gaseous fuel supply based on a sensed gaseous fuel supply pressure of the gaseous fuel supply line, engine intake manifold pressure, and gaseous fuel rail pressure of the gaseous fuel supply line; and
    outputting an indication of reverse flow of air in response to the detection of reverse flow of air.

10. The method of claim 9, wherein the detection of reverse flow of air includes a comparison of the sensed engine intake manifold pressure and the sensed gaseous fuel supply pressure.

11. The method of claim 10, wherein the detection of reverse flow of air includes a comparison of the sensed gaseous fuel rail pressure and the sensed gaseous fuel supply pressure.

12. The method of claim 11, wherein the outputting the indication includes shutting down the engine.

13. The method of claim 12, wherein the detection of reverse flow of air includes sensing a leak from the intake manifold through a valve to the gaseous fuel rail.

14. A reverse flow detection system for a dual fuel engine, comprising:
    an intake manifold for supplying intake air to the engine;
    a liquid fuel supply line for supplying liquid fuel to the engine;
    a gaseous fuel supply line including a gaseous fuel supply and a gaseous fuel rail for supplying gaseous fuel to the engine;
    a valve in the gaseous fuel supply line that automatically blocks a reverse flow of air in the gaseous fuel supply line, the valve being upstream of a gaseous fuel injector; and
    a controller configured to:
        operate the dual fuel engine in a liquid fuel only mode via the liquid fuel supply line;
        detect a reverse flow of air in the gaseous fuel supply line due to a failure of the valve; and
        output an indication of reverse flow of air in response to the detection of reverse flow of air.

15. The system of claim 14, further including a gaseous fuel supply pressure sensor, and wherein the detection of reverse flow of air is based on a sensed gaseous fuel supply pressure of the gaseous fuel supply line.

16. The system of claim 15, further including an intake manifold pressure sensor, and wherein the detection of reverse flow of air is based on a sensed engine intake manifold pressure.

17. The system of claim 16, further including a gaseous fuel rail pressure sensor, and wherein the detection of reverse flow of air is based on a sensed gaseous fuel rail pressure of the gaseous fuel supply line.

18. The system of claim 17, wherein the detection of reverse flow of air includes a comparison of the sensed engine intake manifold pressure and the sensed gaseous fuel supply pressure.

19. The system of claim 18, wherein the detection of reverse flow of air includes a comparison of the sensed gaseous fuel rail pressure and the sensed gaseous fuel supply pressure.

20. The system of claim 19, wherein the outputting the indication includes shutting down the engine.

\* \* \* \* \*